Jan. 27, 1970     H. W. BISCHOFF ET AL     3,492,486
FILM COMPARATOR
Filed May 2, 1966     2 Sheets-Sheet 1
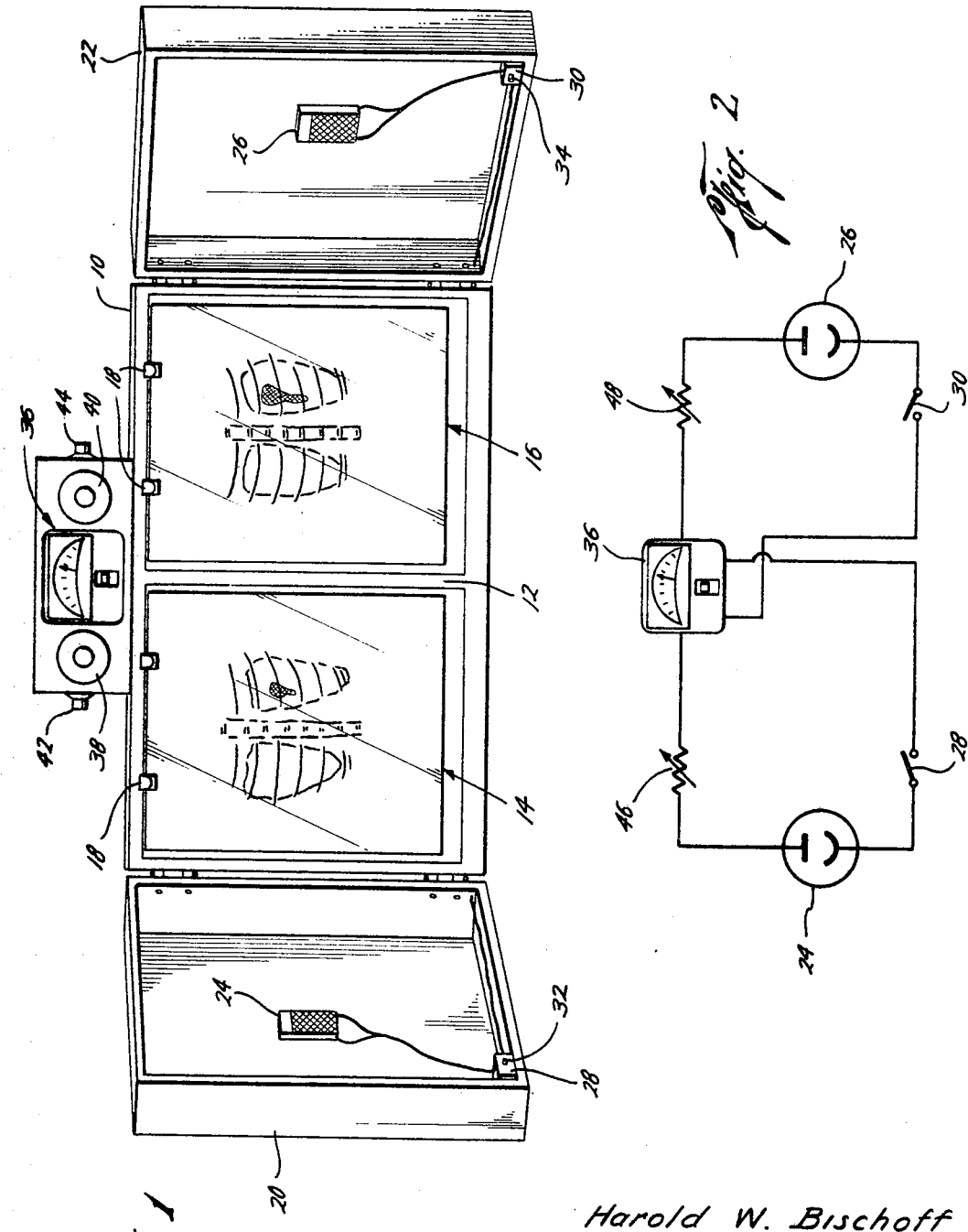
Harold W. Bischoff
James H. Cannon
INVENTORS
BY J. Vincent Martin
Joe E. Edwards
Jack R. Springett
ATTORNEYS

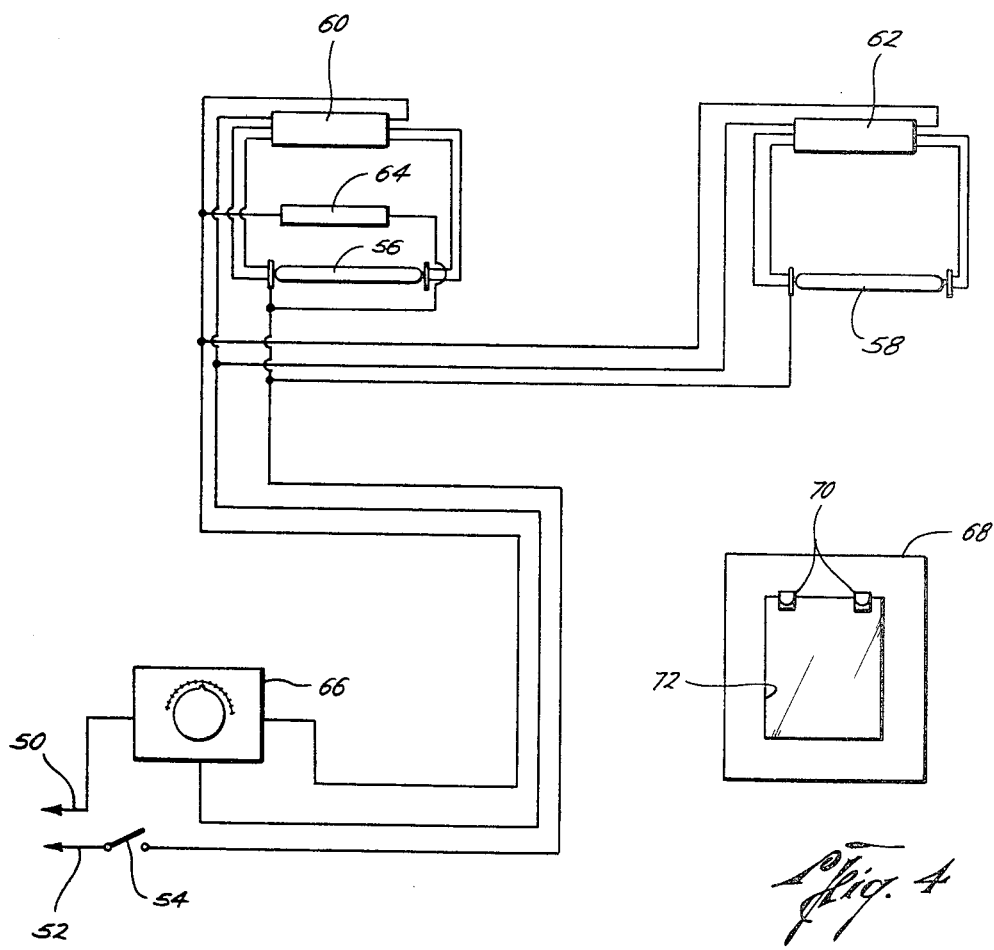

United States Patent Office
3,492,486
Patented Jan. 27, 1970

3,492,486
FILM COMPARATOR
Harold W. Bischoff and James H. Cannon, both of
P.O. Box 488, Dimmitt, Tex. 79027
Filed May 2, 1966, Ser. No. 546,901
Int. Cl. G01j 1/36; G01n 21/22
U.S. Cl. 250—204    12 Claims

ABSTRACT OF THE DISCLOSURE

A film viewing comparator having a case with two compartments therein, a light source in each compartment, a viewing area for each compartment into which film is to be placed for viewing and a means of varying the intensity of at least one of the light sources to compensate for differences in density of the films in the viewing area to assure that the viewer can clearly distinguish minor actual differences in the subject on the film.

---

The present invention generally relates to an improved film viewing device and more specifically to a lighted film viewing device for the viewing of at least two films and having provision for adjusting the light intensity to compensate for variations of density of the films.

An object of the present invention is to provide a new and improved lighted film viewing device including compensation for variation in density between two films which are to be viewed.

Another object is to provide a new and improved film viewing device in which different densities of films may be detected and compensated before viewing.

A further object is to provide a new and useful device for viewing two X-rays and compensating for the difference in the film density of the two X-rays.

Still another object is to provide a new and improved viewing comparator for films with provision for detecting and varying the light intensity passing through the films.

These and other objects, features and advantages of the invention will be apparent from the following specification and by reference to the accompanying drawings forming a part thereof, wherein an example of the constructions designed to carry out the invention is shown, and wherein:

FIGURE 1 is a perspective view of the preferred form of comparative viewing device of the present invention;

FIGURE 2 is a schematic wiring diagram of the circuit for the light sensing device;

FIGURE 3 is a schematic wiring diagram of the light circuit for one section of the viewing device; and FIGURE 4 is an elevation view of an adaptor for centering smaller films in the viewing area.

Most often in the diagnoses of illnesses and in determining the progress of treatments, it is advantageous for physicians and surgeons to compare two X-ray films of the body structures of the same patient in side-by-side comparison. A difficulty commonly encountered in such comparisons is that even though the X-ray film is of the same patient, it may have been exposed for a different time period or at a different power setting thereby creating film having a different density which, when viewed, may obscure the particular differences that need to be located. Other factors may contribute to these differences in film density including variations in different batches of film, variations in the exposure characteristics of the film of different manufacturers and variations in the technique in exposing the film. Even with two X-ray films of the same portion of one patient's body taken at fairly close intervals in time by the same technician using the same apparatus and with identical exposure parameters, such films almost invariably have slightly different densities.

It has been discovered that by providing appropriate values of light intensity behind the films to be viewed, when such films have different densities, such films can be matched in a manner to clearly bring out the differences for which the doctor is searching.

The viewing device of the present invention, as illustrated in the drawings, provides an improved device which will easily and accurately compensate for the densities in such films in order to allow the doctor to accurately ascertain changes which may have occurred in the body structures of the patient between the times at which the two X-ray films were taken.

Referring to FIGURE 1, the illustrated form of device of the present invention includes a case or container 10 having a central partition 12 dividing the case 10 into two separate zones. Each zone is provided with a suitable light source which illuminates the respective viewing areas 14 and 16 through the usual translucent glass. The upper portion of viewing areas is provided with suitable means, such as clips 18, to receive and hold a film in proper position over the viewing area.

The covers 20 and 22 are hinged to the case 10. The cover 20 is adapted, when closed, to cover the viewing area 14 and to exclude substantially all external light therefrom. In a similar manner, the cover 22 is adapted, when closed, to cover the viewing area 16 and exclude all external light therefrom. The light intensity sensing means 24 and 26 are mounted centrally in the covers 20 and 22, respectively. The light intensity sensing means, as shown, are photocells which provide electrical output when exposed to light. The leads from the respective photocells connect to the microswitches 28 and 30. Each microswitch is provided with a toggle 32 and 34, respectively, which is adapted to engage the lower front surface of the case 10 when the covers are closed. Complete closing of the covers causes the toggles to be depressed in such a manner to complete the circuits through the microswitches. The leads from the microswitches extend through the cover to the indicating means 36 which is mounted on the top of the case 10. Included with the indicating means 36 are the light intensity control knobs 38 and 40 for the light sources within the case 10 and the calibration adjusting knobs 42 and 44. Both of the photocells 24 and 26 are connected to the indicating means 36, as hereinafter explained, so that the indicating means 36 provides an indication of the difference in intensity of light sensed by the photocells.

The circuit for the light sensing and indicating means is illustrated in FIGURE 2. As shown, the two photocells 24 and 26 are connected in series opposition to the indicating means 36. The circuit for photocell 24 is in series with the microswitch 28 and the variable resistance 46 controlled by the calibration control knob 42. Similarly, the circuit for the photocell 26 is connected in series with the microswitch 30 and the variable resistance 48 which is controlled by the calibration control knob 44. With the two photocells 24 and 26 being connected in series opposition to the indicating means 36, whenever they are exposed to the same intensity, the reading on the indicating means 36 is zero; that is, the needle will be centered. The indicating means 36, which has been found to be suitable for use, is a microammeter. In calibrating these indicating circuits, care should be taken not to expose the meter 36 to more than a full scale reading.

The light sources for each viewing area are substantially identical and are controlled by the light intensity control knobs 38 and 40. FIGURE 3 illustrates a schematic wiring diagram of the type of light source (fluorescent lights) for one viewing area and is representative of the wiring for the light source in the other viewing area. Electric power is supplied to the light source through the leads 50 and 52 under control by the switch 54. As shown in FIGURE 3, each light source includes two lamps 56 and 58 with the dimming ballasts 60 and 62 being connected with respect to the lamps in the usual manner and the compensator 64 being connected across the lamp 56 and the dimming ballast 60 as shown. The intensity of the lamps 56 and 58 is controlled by the dimmer control 66. This dimmer control is connected to one of the light intensity control knobs 38 and 40.

To be able to accommodate varying sizes of films, it has been found desirable to provide a suitable film holder having the desired opening to accommodate the size of the film and also substantially masking the rest of the viewing area. Such a film adapter 68 is illustrated in FIGURE 4. It includes the suitable means 70 for retaining a film in the viewing space 72 defined by the adapter 68. It can be seen that the adapter 68 positions a smaller-size film in the viewing space 72 which is the central part of the viewing area of the case 10. Such adapters also properly position the film with respect to the photocells for operation of the device.

In operation, it is suggested that the device initially be calibrated before inserting film to be used. With no film in the viewing areas and with the doors open, the light sources are turned on and reduced to a minimum by proper manipulation of the control knobs 38 and 40. Thereafter, both doors are shut at the same time. Closing of the doors activates the photocell circuits by closing the microswitches 28 and 30. With both doors closed and the light source at a minimum, the indicating means 36 is adjusted by the calibration controls 42 and 44 to provide a zero reading on the indicating means 36. Thereafter, the light sources are simultaneously increased to a maximum by manipulation of the control knobs 38 and 40. At full illumination the indicating meter 36 should again be checked and, if necessary, calibrated for a zero reading. When the calibration is complete, the two films to be compared are inserted into the viewing areas, being held therein by the clips 18. With the films in position, the doors are again simultaneously closed and the meter reading is balanced by maintaining one light source at maximum and reducing the other light source until the meter reading of the indicating means 36 is centered or indicates a zero reading. This zero reading indicates that the differences in densities of the films being viewed have been compensated and that the same amount of light is passing through each film. In this condition, each film then has the same apparent density.

It should be pointed out that the location of the photocells may be at any position in the covers 20 and 22 so long as they are exposed to the same area of the body structure of the film being viewed. For example, in chest X-rays it is suggested that they be positioned approximately in the center of the covers. In such position they will normally intercept light passing through the heart shadow of the X-ray. This portion of the film is relatively clear and has a density proportional to the density of any other part of the film. Also, with the central location of the photocells and by using the film adapters 68, the photcells are properly positioned for all film sizes.

From the foregoing it can be seen that the present invention provides an improved lighted viewing comparator which includes compensation for variation in density of two films. This device also provides a means for sensing this difference in film density by sensing the amount of light passing through related areas of the film and a means for compensating for density differences by increasing the relative illumination of the more dense of the two films.

The foregoing disclosure and description of the invention are illustrative and explanatory thereof, and various changes in the size, shape and materials, as well as in the details of the illustrated construction, may be made with- in the scope of the appended claims without departing from the spirit of the invention.

What is claimed is:
1. A film viewing comparator, comprising
a case having two compartments therein,
a viewing area for each compartment,
a light source in each compartment, and
means for varying the intensity of at least one of said light sources to compensate for the difference in the densities of films in the respective viewing areas.

2. A film viewing comparator, comprising
a case having two compartments therein,
a variable light source for each compartment,
a viewing area for each compartment,
means for mounting a film in each viewing area,
means sensing the intensity of light in each viewing area, and
indicating means connected to said sensing means to indicate the light intensity emanating from each viewing area whereby said variable light sources may be adjusted to balance the light intensity passing through the film in the viewing areas.

3. A film viewing comparator according to claim 2, wherein
said sensing means includes a photocell for each viewing area which is adapted to be moved into a central position with respect to each viewing area.

4. A film viewing comparator according to claim 3, including
a cover for said film viewing areas,
said photocells being mounted in said cover to be positioned centrally of the viewing areas when said cover is closed,
said cover when closed on said viewing areas excluding substantially all external light from the viewing areas.

5. A film viewing comparator according to claim 3, wherein
said photocells are connected to deliver their electric output to said indicating means.

6. A film viewing comparator according to claim 5, wherein
said indicating means includes a single electric current indicating device, and
the output of said photocells is connected to said device in opposition whereby an indication of zero current flow is indicative of equal intensity of light sensed by said photocells.

7. A film viewing comparator according to claim 6, including
a variable resistance in series with each of said photocells for calibration of the output of said photocells.

8. A film viewing comparator according to claim 7, including
a light intensity control connected to each light source to vary the intensity of light of the light sources whereby the differences in density of films in the two viewing areas are balanced by a difference in intensity of the light sources to provide substantially the same amount of light passing through each film.

9. A film viewing comparator according to claim 7, including
a cover for each viewing area,
said photocells mounted in said covers,
a switch in each circuit connecting the photocells and said indicating device,
one of said switches positioned in each cover and adapted to close only when said cover is closed on its viewing area,
closing of said switch responsive to closing of said cover completing the circuit between said photocells and said indicating device.

10. A device adapted to view at least two different films, comprising
a case having two viewing areas, a source of light within the case for each viewing area and adapted to light its viewing area, a closure for said case adapted to cover said viewing area to prevent entry of external light when said closure is closed, means sensing the intensity of light from each viewing area, means associated with each light source to vary the intensity thereof, and indicating means to indicate the intensity of light received by said light sensing means.

11. A device according to claim 10, wherein said sensing means is connected to said indicating means in opposed relation to each other whereby said indicating means indicates the difference in light intensity of said viewing areas.

12. A device according to claim 11, including a film holder adapter for each viewing area, each of said adapters when positioned over a viewing area adapted to hold a film in a desired position for confrontation by said photocell and to mask the remainder of said viewing area.

References Cited

UNITED STATES PATENTS

| | | | |
|---|---|---|---|
| 2,101,710 | 12/1937 | Huber | 250—239 |
| 2,978,954 | 4/1961 | Watson | 250—220 |
| 2,594,514 | 4/1952 | Sweet | 250—209 X |
| 3,339,076 | 8/1967 | Hilal | 250—220 |

JAMES W. LAWRENCE, Primary Examiner

E. R. LA ROCHE, Assistant Examiner

U.S. Cl. X.R.

40—106.1; 356—206